US011892914B2

United States Patent
Appireddygari Venkataramana et al.

(10) Patent No.: US 11,892,914 B2
(45) Date of Patent: Feb. 6, 2024

(54) SYSTEM AND METHOD FOR AN APPLICATION CONTAINER PRIORITIZATION DURING A RESTORATION

(71) Applicant: EMC IP Holding Company LLC, Hopkinton, MA (US)

(72) Inventors: Mahesh Reddy Appireddygari Venkataramana, Bangalore (IN); Shelesh Chopra, Bangalore (IN); Chetan Battal, Bangalore (IN); Swaroop Shankar D H, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 517 days.

(21) Appl. No.: 16/925,621

(22) Filed: Jul. 10, 2020

(65) Prior Publication Data
US 2021/0374019 A1 Dec. 2, 2021

(30) Foreign Application Priority Data
May 27, 2020 (IN) .............................. 202041022161

(51) Int. Cl.
*G06F 11/14* (2006.01)
*G06F 9/54* (2006.01)

(52) U.S. Cl.
CPC ............ *G06F 11/1469* (2013.01); *G06F 9/54* (2013.01); *G06F 2201/805* (2013.01)

(58) Field of Classification Search
CPC ............................. G06F 11/1469; G06F 9/54
See application file for complete search history.

(56) References Cited

U.S. PATENT DOCUMENTS

| 2010/0268568 | A1* | 10/2010 | Ochs | G06Q 10/10 |
| | | | | 705/7.27 |
| 2016/0170844 | A1* | 6/2016 | Long | G06F 11/1469 |
| | | | | 707/679 |
| 2017/0060699 | A1* | 3/2017 | Hohl | G06F 11/1469 |
| 2018/0024889 | A1* | 1/2018 | Verma | G06F 11/0766 |
| | | | | 714/15 |
| 2019/0132188 | A1* | 5/2019 | Wang | H04L 41/40 |
| 2019/0332473 | A1* | 10/2019 | Yang | H03M 13/373 |

* cited by examiner

Primary Examiner — Apu M Mofiz
Assistant Examiner — Farhad Agharahimi
(74) Attorney, Agent, or Firm — Chamberlain, Hrdlicka, White, Williams & Aughtry; Aly Z. Dossa

(57) ABSTRACT

The method includes obtaining, by a restoration policy manager, a restoration request for a plurality of application containers, and in response to the restoration request: obtaining, by a backup server, container information associated with the plurality of application containers, assigning a restoration type to each application container in the plurality of application containers, updating a restoration type list based on the assigning, and initiating a restoration of the plurality of application containers using the restoration type list.

17 Claims, 4 Drawing Sheets

SYSTEM AND METHOD FOR AN APPLICATION CONTAINER PRIORITIZATION DURING A RESTORATION

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a restoration policy manager, a restoration request for a plurality of application containers, and in response to the restoration request: obtaining, by a backup server, container information associated with the plurality of application containers, assigning a restoration type to each application container in the plurality of application containers, updating a restoration type list based on the assigning, and initiating a restoration of the plurality of application containers using the restoration type list.

In general, in one aspect, the invention relates to a system that includes a processor and memory that includes instructions which, when executed by the processor, perform a method. The method includes obtaining, by a restoration policy manager, a restoration request for a plurality of application containers, and in response to the restoration request: obtaining, by a backup server, container information associated with the plurality of application containers, assigning a restoration type to each application container in the plurality of application containers, updating a restoration type list based on the assigning, and initiating a restoration of the plurality of application containers using the restoration type list.

In general, in one aspect, the invention relates to a non-transitory computer readable medium that includes computer readable program code, which when executed by a computer processor enables the computer processor to perform a method for performing backup operations. The method includes obtaining, by a restoration policy manager, a restoration request for a plurality of application containers, and in response to the restoration request: obtaining, by a backup server, container information associated with the plurality of application containers, assigning a restoration type to each application container in the plurality of application containers, updating a restoration type list based on the assigning, and initiating a restoration of the plurality of application containers using the restoration type list.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to systems and methods for performing restorations on applications and/or application containers. The restorations may include utilizing a container application programming interface (API) to identify characteristics of an application and/or an application container to determine a restoration type to be performed on the application containers. The restoration type may determine how much computing resources of a production host may be used to perform the restoration on an application container. The restoration type assigned to each application container may be stored in a restoration type list accessed by a restoration type performing a restoration. The restoration agent may perform the restoration in accordance with the restoration type list.

Figure 1:
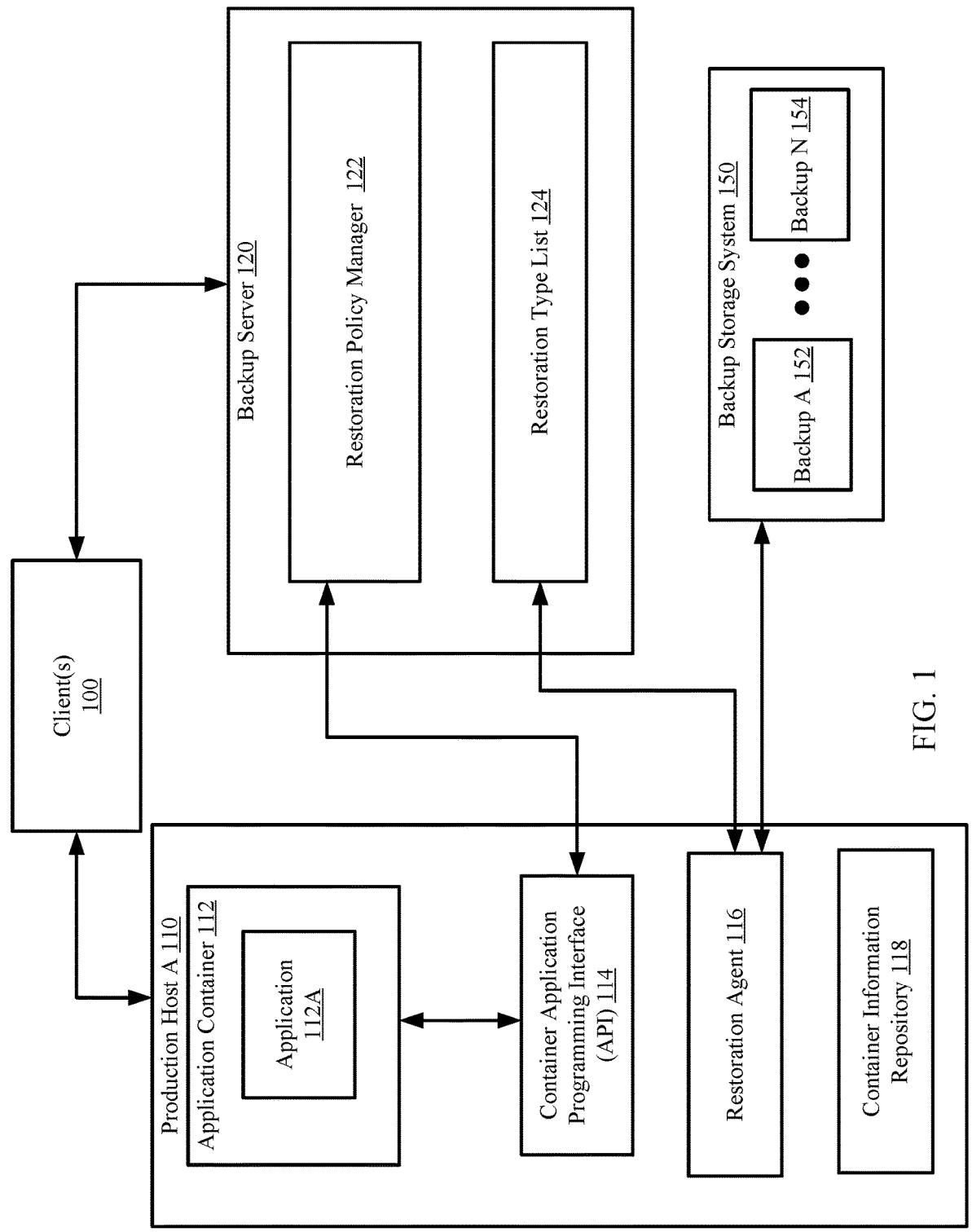
FIG. 1 shows a diagram of a system in accordance with one or more embodiments of the invention.

FIG. 1 shows a diagram of a system in accordance with one or more embodiments of the invention. The system may include one or more clients (100), a production host (110), a backup server (120), and a backup storage system (150). The system may include additional, fewer, and/or different components without departing from the invention. Each component may be operably connected to any of the other components via any combination of wired and/or wireless connections. Each of the aforementioned components is discussed below.

In one or more embodiments of the invention, the production host (110) stores application containers (e.g., 112). The application containers (e.g., 112) may be logical entities that are executed using computing resources (not shown) of the production host (110). An application container (112)

may include an application (e.g., 112A). Each of the applications (e.g., 112A) hosted by the production host (110) may be performing similar or different processes. In one or more embodiments of the invention, the application (112A) provides services to users, e.g., clients (100). For example, the application (112A) may host components. The components may be, for example, instances of databases, email servers, and/or other applications. The application (112A) may host other types of components without departing from the invention. While the production host is illustrated to include one application container (112), the production host may include multiple application containers without departing from the invention. Further, while the application container (112) is illustrated to include an application (112A), the application container (112) may include multiple applications without departing from the invention. The discussion of the application container (112) throughout this application may apply to any application container hosted by the production host (110).

While the system of FIG. 1 and the discussion of the application container (112) throughout this application may specify that the application container (112) hosts one application, those skilled in the art may appreciate that the application container may host any number of applications without departing from the invention.

In one or more embodiments of the invention, the application container (112) is implemented as computer instructions, e.g., computer code, stored on a persistent storage (e.g., on the production host (110)) that when executed by a processor(s) of the production host (110) cause the production host (110) to provide the functionality of the application container (112) described throughout this application.

In one or more embodiments of the invention, the application container utilizes a container application programming interface (API) that is used to obtain information of the application containers (e.g., 112). The information may be provided to the backup server (120) via the container API. In one or more embodiments of the invention, the container API is used by a restoration policy manager (122) of the backup server (120) to obtain container information of one or more application containers (e.g., 112).

In one or more embodiments of the invention, container information of an application container may include any information about an application container that may impact how an application is restored during a restoration. For example, the container information may specify virtual cluster information. The virtual cluster information may specify whether the application container is part of an application container cluster (also referred to as a virtual cluster). In one or more embodiments of the invention, an application container cluster is a grouping of application containers in which the applications utilize shared resources (e.g., processing, persistent storage, etc.) of the production host. As a second example, the container information may specify whether the application containers utilize shared storage of a second production host (not shown).

Additional examples of container information include, but are not limited to, virtual cluster information, shared storage information (e.g., whether the application container utilizes a storage that is shared with one or more application containers), storage redundancy information (e.g, whether a replica service that generates replicas of the application data and is distributed to other production hosts is utilized by the application containers), whether a load balancing is performed on networking ports between the production hosts, an amount of input/output operations per second (IOPS) utilized by the application containers, and criticality scores of the application containers. In one or more embodiments of the invention, a criticality score of an application container is a value (e.g., a numerical value) that specifies how valuable, private, and/or otherwise sensitive the data in the application container is.

In one or more embodiments of the invention, the container information is stored in a container information repository (118). In one or more embodiments of the invention, the container information repository (118) includes container information for each application container (e.g., 112) in the production host (110). Additionally, the container information repository (118) may store container information from additional application containers that are not in the production host. These additional application containers may be, for example, (i) application containers that were at one point in time in the production host, (ii) application containers that have been scheduled to be hosted by the productions host in a future point in time, and/or (iii) application containers that have never been hosted by the production host. In one or more embodiments of the invention, the container information repository (118) is implemented as a database. The database may include one or more entries that each specify all, or a portion thereof, of an application container.

In one or more embodiments of the invention, the production host (110) further includes a restoration agent (116). The restoration agent (116) may include functionality for restoring application containers (e.g., 112) using backups of the application container (112). The backups may include copies of data objects. The data objects may be, for example, documents, files, collections of files, and/or other portions of data that may be associated with an application.

In one or more embodiments of the invention, the restoration agent (116) may obtain backups from the backup storage (150) and restore the backups based on a restoration type. The restoration type to be used may be specified in a restoration type list (124) (discussed below) maintained by the backup server (120).

In one or more embodiments of the invention, the restoration agent (116) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the restoration agent (116) described throughout this application.

In one or more embodiments of the invention, the restoration agent (116) is implemented as computer instructions, e.g., computer code, stored on a persistent storage that when executed by a processor of the production host (110) causes the production host (110) to provide the functionality of the restoration agent (116) described throughout this application.

Figure 4:
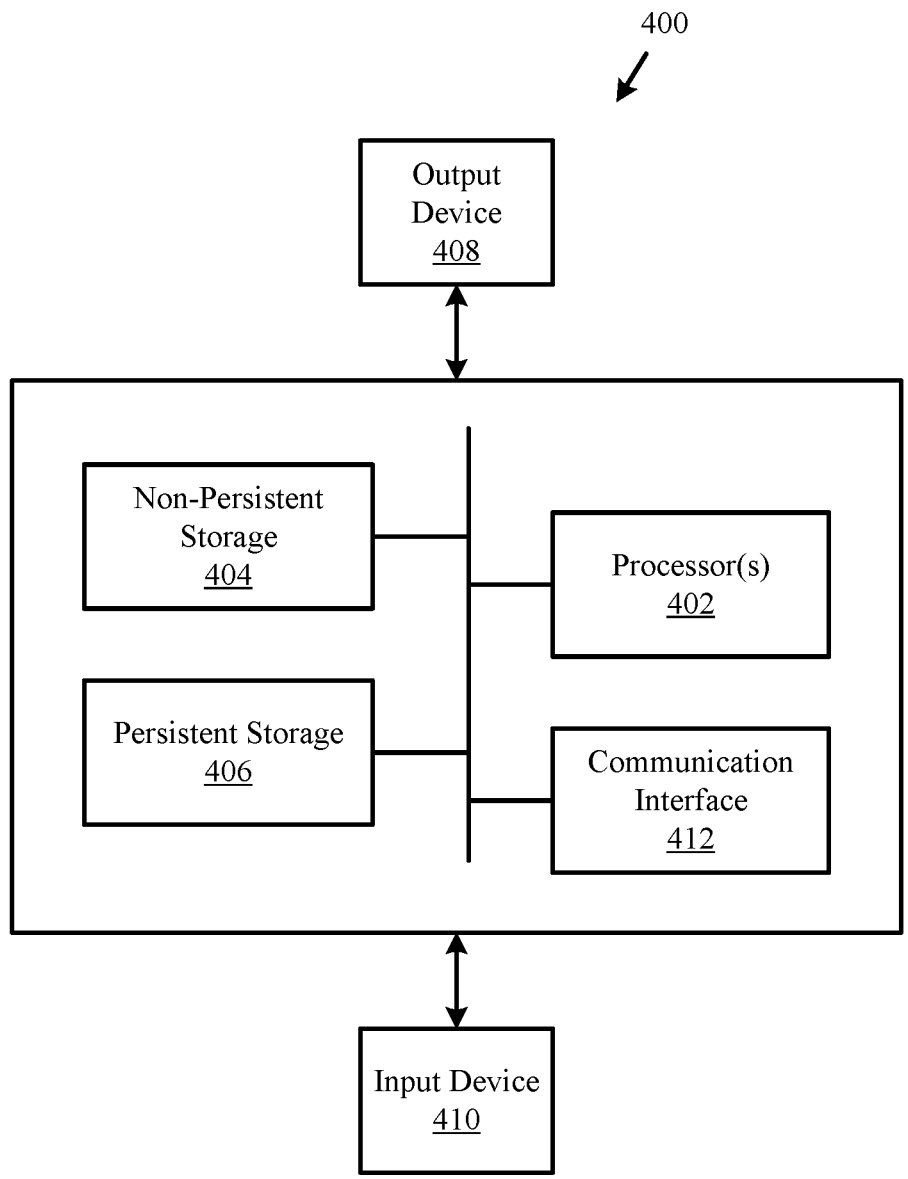
FIG. 4 shows a diagram of a computing device in accordance with one or more embodiments of the invention.

In one or more embodiments of the invention, the production host (110) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110) described throughout this application.

In one or more embodiments of the invention, the production host (110) is implemented as a logical device. The logical device may utilize the computing resources of any number of computing devices and thereby provide the functionality of the production host (110) described throughout this application.

In one or more embodiments of the invention, the backup server (120) manages the operation of restoring application containers (e.g., 112) to a previous point in time using a backup storage system (150). To perform the aforementioned functionality, the backup server (120) may include a restoration policy manager (122) and a restoration type list (124). The backup server (120) may include additional, fewer, and/or different components without departing from the invention. Each of the aforementioned components are discussed below.

In one or more embodiments of the invention, the restoration policy manager (122) processes container information to prioritize the application containers operating in the production hosts (e.g., 110) during a restoration. In one or more embodiments of the invention, the restoration policy manager (122) may determine a restoration type to be applied to the application container during a restoration. The container information may be processed in accordance with FIG. 2.

Figure 2:
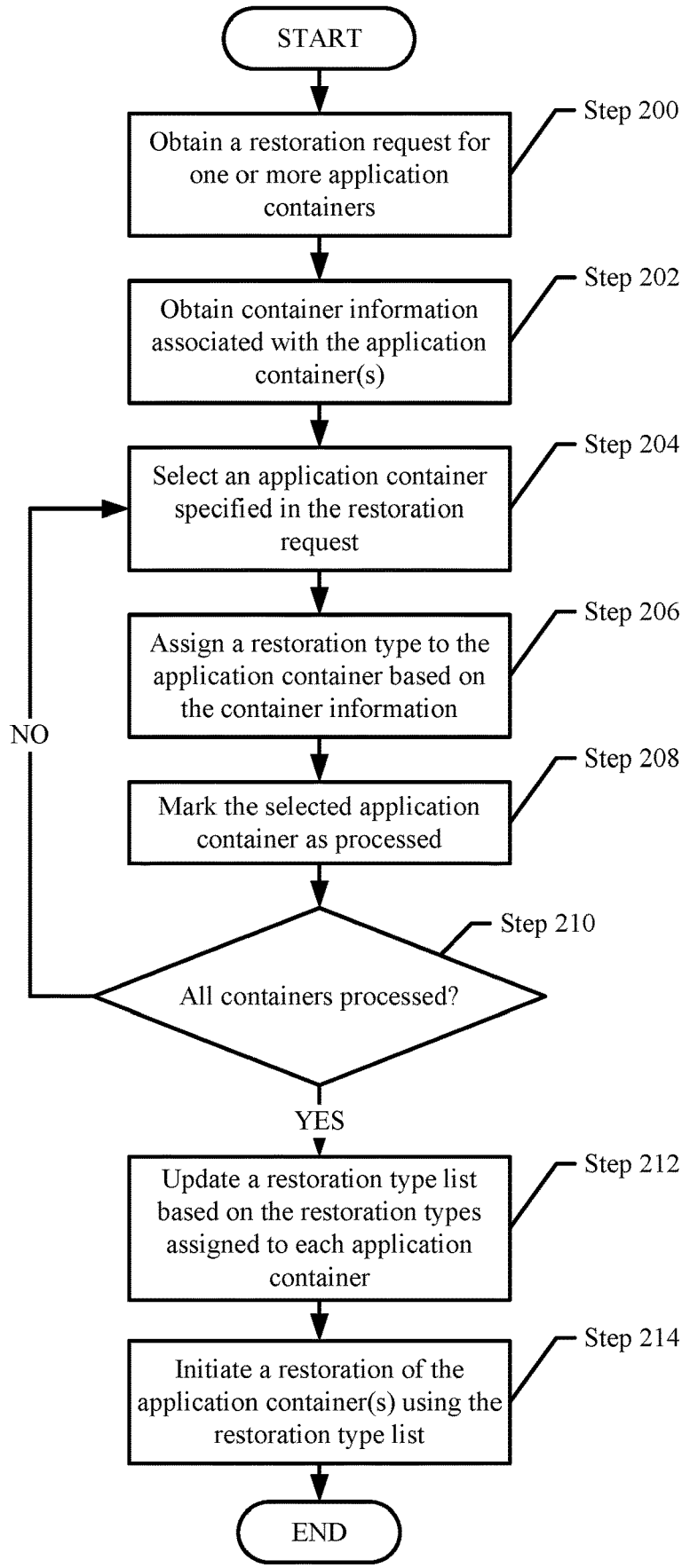
FIG. 2 shows a flowchart for performing a restoration of one or more application containers in accordance with one or more embodiments of the invention.

In one or more embodiments of the invention, the restoration policy manager (122) is implemented as computer instructions, e.g., computer code, stored on a persistent storage that when executed by a processor of the backup server (120) causes the backup server (120) to provide the functionality of the restoration policy manager (122) described throughout this application and/or all, or a portion thereof, of the method illustrated in FIG. 2.

In one or more embodiments of the invention, the restoration type list (124) specifies a restoration type to be implemented on an application container during a restoration. A restoration type may be a type of operation implemented when transferring a backup of an application container to the production host (110) and when installing the backup to the production host. The restoration type may be based on an amount of computing resources used to perform the restoration.

For example, a first restoration type may be an instant restoration. The instant restoration may be a restoration that utilizes as much network bandwidth available to transfer the backup quickly to the production host. The instant restoration may be the fastest of any restoration types in terms of the time between the initialization of the restoration and the availability of access to the application container by the client(s) (100). The availability of the access may be sped up by allowing the client(s) (100) to be able to write to the application container prior to the completion of the restoration. In this manner, the restoration agent (116) may restore the more essential components of the application container first to increase the speed of the availability.

As a second example, a second restoration type may be a write-ahead restoration. A write-ahead restoration may be a more standard restoration that waits for a certain amount of the application container to be restored before the application container is accessed by the clients. The restoration may not include prioritizing the essential components of the application container.

As a third example, a third restoration type may be a simple point-in-time restoration. In one or more embodiments of the invention, a simple point-in-time restoration is a restoration that allows minimal available network bandwidth to transfer the application container backups to the production host. The application container(s) restored using the point-in-time restoration type may not be available to be accessed by the client(s) (100) until after the restoration is completed. The restoration types may be categorized via any other mechanisms without departing from the invention.

In one or more embodiments of the invention, the backup server (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup server (120) described throughout this application.

In one or more embodiments of the invention, the backup server (120) is implemented as a logical device. The logical device may utilize the computing resources of any number of computing devices and thereby provide the functionality of the backup server (120) described throughout this application.

In one or more embodiments of the invention, the client(s) (100) utilize services provided by the production host (110), and/or the backup server (120). Specifically, the client(s) (100) may utilize the application containers (112) to obtain, modify, and/or store data. The data may be generated from applications (e.g., 112A) hosted in the application container (112). Further, the client(s) (100) may utilize the backup server (120) to initiate backups of the application containers (e.g., 112). The client(s) (100) may trigger a backup operation performed by the backup server (120) by sending a backup request to the restoration agent (116) that specifies backing up the application container (112).

In one or more embodiments of the invention, a client (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storage system (150) store backups of data objects associated with the application containers. In one or more embodiments of the invention, a backup is a copy of a data object to be stored in a backup storage system (150). The data object may be data associated with an application (e.g., 112A).

In one or more embodiments of the invention, the backup storage system (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

FIG. 2 shows a flowchart in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel.

FIG. 2 shows a flowchart for generating classification tags in accordance with one or more embodiments of the invention. The method shown in FIG. 2 may be performed by, for example, a restoration policy manager (122, FIG. 1). Other components of the system illustrated in FIG. 1 may perform the method of FIG. 2 without departing from the invention.

In step 200, a restoration request is obtained for one or more application containers. In one or more embodiments of the invention, the restoration request specifies the application containers to be restored. The restoration request may be obtained from a client.

In step 202, container information associated with the application container(s) is obtained. In one or more embodiments of the invention, the container information is obtained from a container information repository stored in the production host. The restoration policy manager may analyze the container information repository to identify the container information associated with the specified application containers.

In step 204, an application container specified in the restoration request is selected. The selected application container may be an unprocessed application container specified in the restoration request.

In step 206, a restoration type is assigned to the application container based on the container information. In one or more embodiments of the invention, the restoration type is assigned based on an analysis performed on the application container that utilizes the container information of the selected application container. The container information may be used to identify a level of urgency required for the application container to be restored.

In step 208, the selected application container is marked as processed.

In step 210, a determination is made about whether all application containers are processed. If all application containers are processed, the method proceeds to step 212; otherwise, the method proceeds to step 204.

In step 212, a restoration type list is updated based on the restoration types assigned to each application container. In one or more embodiments of the invention, the restoration type list specifies each application container of the restoration request and the assigned restoration type.

In step 214, a restoration of the application containers is initiated using the restoration type list. In one or more embodiments of the invention, the restoration is initiated by sending a restoration initiation request to the restoration agent. The restoration initiation request may specify the application containers and the restoration types to be performed. Alternatively, the restoration initiation request specifies the application containers and specifies using the restoration type list in the backup server to identify the restoration types to be performed for each application container.

EXAMPLE

Figure 3:
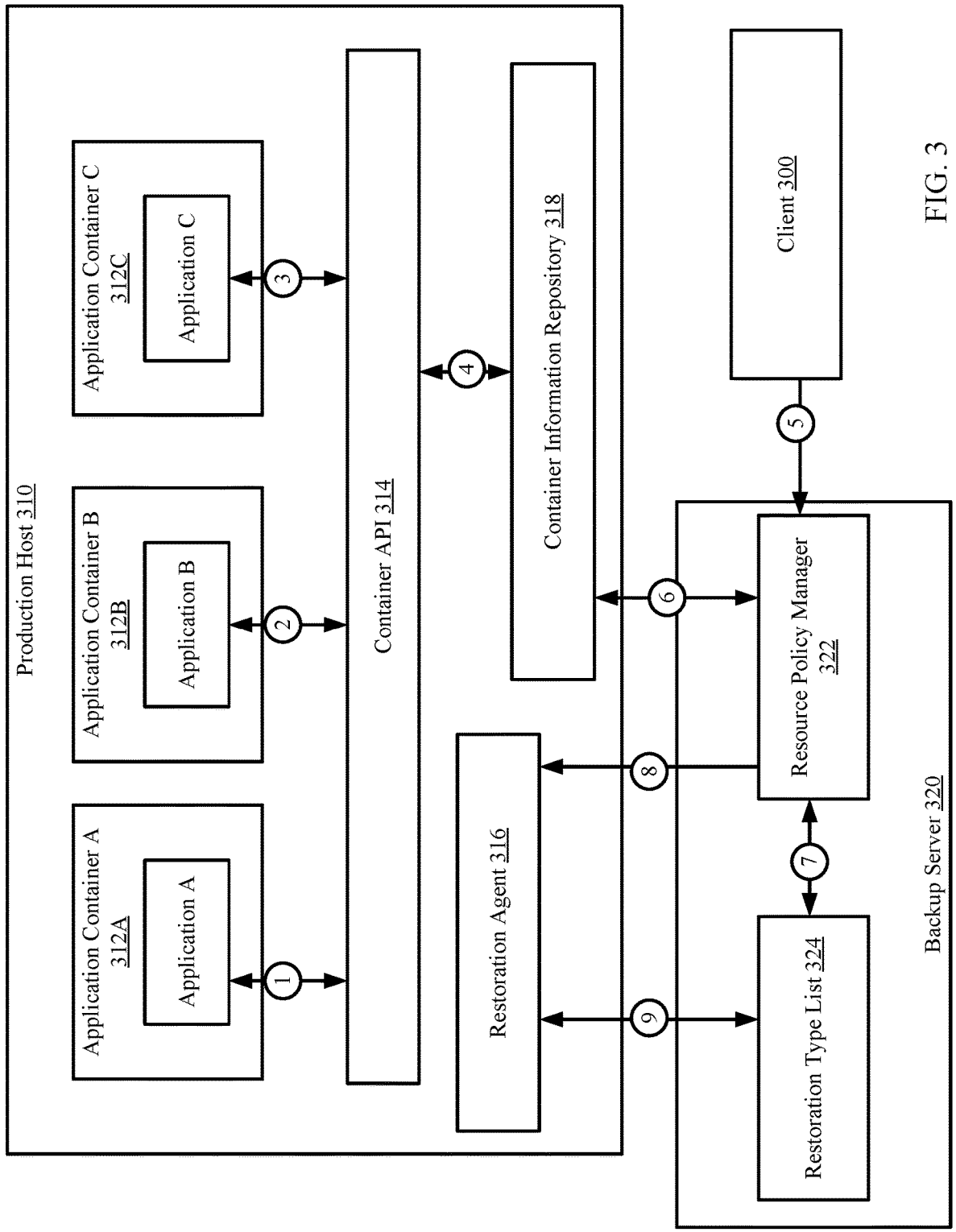
FIG. 3 show an example in accordance with one or more embodiments of the invention.

The following section describes an example. The example, illustrated in FIG. 3, is not intended to limit the invention. Turning to the example, consider a scenario in which a system is monitoring events occurring in application containers hosted by a production host.

FIG. 3 shows an example system. The example system includes a production host (310) that includes three application containers (312A, 312B, 312C), a container API (314) that obtains container information for the three containers (312A, 312B, 312C) and provides the container information to the backup server (320).

At a first point in time, the container API (314) obtains the container information from application containers A, B, and C [1, 2, 3]. The container information specifies that application containers A and B (312A, 312B) have a criticality score of eight and nine (out of a maximum possible ten), respectively. Further, the container information specifies that application container C (312C) has a low IOPS measurement. The obtained container information is stored in a container information repository (318) [4].

At a later point in time, a client (300) sends a restoration request to a resource policy manager (322) to restore applications A, B, and C (312A, 312B, 312C) to a point in time from seven days ago [5]. The resource policy manager (322), in response to the restoration request, performs the method of FIG. 2. Specifically, the resource policy manager (322) obtains container information of the specified applications from the container information repository (318) in the production host (310) [6].

Further to following the method of FIG. 2, the resource policy manager (322) updates a restoration type list (324) based on the obtained container information. Because applications A and B have a high criticality score, an instant restoration type is assigned to each of applications A (312A) and B (312). In contrast, application C is assigned a point-in-time restoration type. The assigned restoration types are stored in the restoration type list (324) [7].

Following the update to the restoration type list (324), the restoration policy manager (322) sends a restoration initiation request to the restoration agent (316) that specifies restoring the applications (312A, 312B, 312C) to the specified point in time. The restoration agent (316), in response to the restoration initiation request, accesses the restoration type list (324) to determine the restoration to be performed on the applications (312A, 312B, 312C) [9]. The restoration agent then initiates the restorations based on the identified restoration types for each application.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the restoration agent. Further, such instructions may correspond to computer readable instructions that are stored on one or more non-transitory computer readable mediums.

One or more embodiments of the invention may improve the operation of one or more computing devices. More specifically, embodiments of the invention improve the reliability of restorations of one or more application containers. Prior to initiating restorations of one or more application containers, a resource policy manager may analyze container information about the application containers to determine a restoration type to be assigned to each application container. The restoration type may specify an amount of computing resources to be applied to the restoration of an application container. Each restoration type may specify a varying degree of efficiency for the computing resources. Application containers with a higher priority, urgency requirement, and/or sensitivity may utilize more computing resources to make such restorations more efficient. In contrast, the less urgent or sensitive application containers may utilize fewer resources during a restoration, thus increasing the overall efficiency of the system in which the restorations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing application containers, the method comprising:
 obtaining, by a restoration policy manager, a restoration request for a plurality of application containers to be restored in a production host; and
 in response to the restoration request:
  obtaining, by a backup server, container information associated with the plurality of application containers, wherein the container information comprises information for an application container that was at one point in time in the production host, a second application container that is scheduled to be hosted by the production host, and a third application container that has never been hosted by the production host;
  assigning a restoration type to each application container in the plurality of application containers using the container information, wherein the plurality of application containers comprises the application container, the second application container, and the third application container;
  updating a restoration type list based on the assigning; and
  initiating a restoration of the plurality of application containers using the restoration type list.

2. The method of claim 1, wherein the container information is obtained from a container information repository.

3. The method of claim 1, wherein the restoration type comprises at least one of: an instant restoration type, a write-ahead restoration type, and a simple point-in-time restoration type.

4. The method of claim 1, wherein initiating the restoration of the plurality of application containers comprises:
 sending a restoration initiation request to a restoration agent executing on the production host,
 wherein the restoration initiation request specifies each of the plurality of application containers and the restoration type of each of the plurality of application containers.

5. The method of claim 4, wherein the restoration policy manager is operatively connected to the production host.

6. The method of claim 1, wherein the container information is obtained using a container application programming interface (API).

7. A system, comprising:
 a processor; and
 memory comprising instructions which, when executed by the processor, perform a method, the method comprising:
  obtaining, by a restoration policy manager, a restoration request for a plurality of application containers to be restored in a production host; and
  in response to the restoration request:
   obtaining, by a backup server, container information associated with the plurality of application containers, wherein the container information comprises information for an application container that was at one point in time in the production host, a second application container that is scheduled to be hosted by the production host, and a third application container that has never been hosted by the production host;

assigning a restoration type to each application container in the plurality of application containers using the container information, wherein the plurality of application containers comprises the application container, the second application container, and the third application container;

updating a restoration type list based on the assigning; and initiating a restoration of the plurality of application containers using the restoration type list.

8. The system of claim 7, wherein the container information is obtained from a container information repository.

9. The system of claim 7, wherein the restoration type comprises at least one of: an instant restoration type, a write-ahead restoration type, and a simple point-in-time restoration type.

10. The system of claim 7, wherein initiating the restoration of the plurality of application containers comprises:

sending a restoration initiation request to a restoration agent executing on the production host, wherein the restoration initiation request specifies each of the plurality of application containers and the restoration type of each of the plurality of application containers.

11. The system of claim 10, wherein the restoration policy manager is operatively connected to the restoration agent.

12. The system of claim 7, wherein the container information is obtained using a container application programming interface (API).

13. A non-transitory computer readable medium comprising computer readable program code, which when executed by a computer processor enables the computer processor to perform a method, the method comprising:

obtaining a restoration request for a plurality of application containers to be restored in a production host; and in response to the restoration request:

obtaining, by a backup server, container information associated with the plurality of application containers, wherein the container information comprises information for an application container that was at one point in time in the production host, a second application container that is scheduled to be hosted by the production host, and a third application container that has never been hosted by the production host;

assigning a restoration type to each application container in the plurality of application containers using the container information, wherein the plurality of application containers comprises the application container, the second application container, and the third application container;

updating a restoration type list based on the assigning; and initiating a restoration of the plurality of application containers using the restoration type list.

14. The non-transitory computer readable medium of claim 13, wherein the container information is obtained from a container information repository.

15. The non-transitory computer readable medium of claim 13, wherein the restoration type comprises at least one of: an instant restoration type, a write-ahead restoration type, and a simple point-in-time restoration type.

16. The non-transitory computer readable medium of claim 13, wherein initiating the restoration of the plurality of application containers comprises:

sending a restoration initiation request to a restoration agent executing on the production host, wherein the restoration initiation request specifies each of the plurality of application containers and the restoration type of each of the plurality of application containers.

17. The non-transitory computer readable medium of claim 13, wherein the container information is obtained using a container application programming interface (API).

\* \* \* \* \*